United States Patent [19]

Baldwin et al.

[11] Patent Number: 4,646,001
[45] Date of Patent: Feb. 24, 1987

[54] RESISTIVE WEAR SENSORS

[75] Inventors: David G. Baldwin; Albert E. S. White, both of Swansea, Wales

[73] Assignee: Morganite Electrical Carbon Limited, Morriston, Wales

[21] Appl. No.: 669,889

[22] Filed: Nov. 9, 1984

[30] Foreign Application Priority Data

Nov. 21, 1983 [GB] United Kingdom ............... 8331027
Aug. 9, 1984 [GB] United Kingdom ............... 8420250

[51] Int. Cl.$^4$ ................. G08B 21/00; B60T 17/22; G07C 5/08
[52] U.S. Cl. ................. 324/65 P; 188/1.11; 324/51; 340/52 A
[58] Field of Search ............. 188/1.11; 340/52 A, 340/540; 116/208; 324/71.2, 65 P, 51, 425

[56] References Cited

U.S. PATENT DOCUMENTS

| | | | |
|---|---|---|---|
| 3,078,707 | 2/1963 | Weaver | 324/71.2 |
| 3,660,815 | 5/1972 | Rees | 340/52 A |
| 3,958,445 | 5/1976 | Howard | 188/1.11 |
| 4,016,533 | 4/1977 | Ishikawa . | |
| 4,204,190 | 5/1980 | Wiley | 340/52 A |
| 4,298,857 | 11/1981 | Robins . | |
| 4,334,428 | 6/1982 | Fima . | |

FOREIGN PATENT DOCUMENTS

| | | | |
|---|---|---|---|
| 1959983 | 6/1971 | Fed. Rep. of Germany . | |
| 2356242 | 5/1975 | Fed. Rep. of Germany | 188/1.11 |
| 3007887 | 9/1981 | Fed. Rep. of Germany | 188/1.11 |
| 2319880 | 2/1977 | France . | |

Primary Examiner—Reinhard J. Eisenzopf
Assistant Examiner—Jose M. Solis
Attorney, Agent, or Firm—William R. Hinds

[57] ABSTRACT

A wear sensor comprising a pair of outputs for connection to an electrical detection circuit or the like and a link element connected between the outputs and positioned to be worn and broken at a given wear point, and resistor means connected between the outputs to be electrically in parallel with the link element and positioned not to be worn; the resistance of the link element being less than the resistance of the resistor means such that the resistance of the sensor as detected between the outputs will have an initial value, indicating electrical continuity with the sensor, until the sensor is worn to said given wear point and the link broken, and a further, higher value once the link has been broken.

3 Claims, 8 Drawing Figures

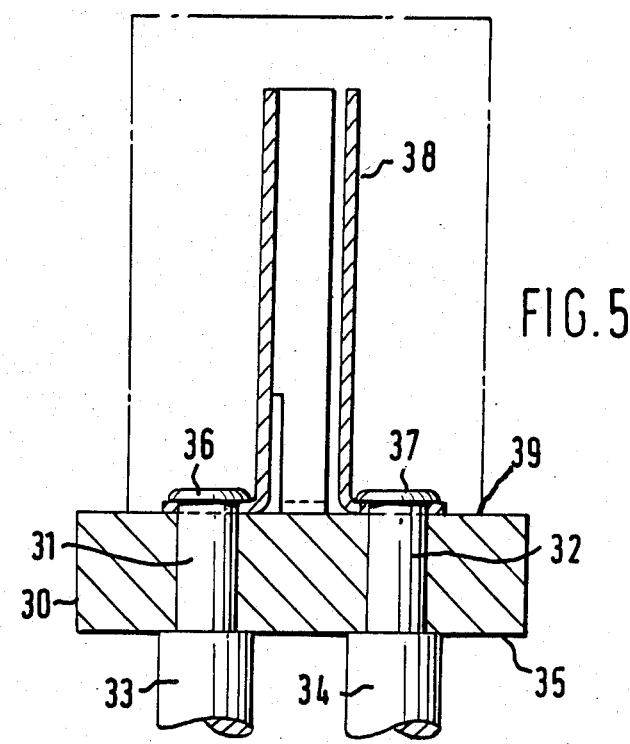
FIG. 5
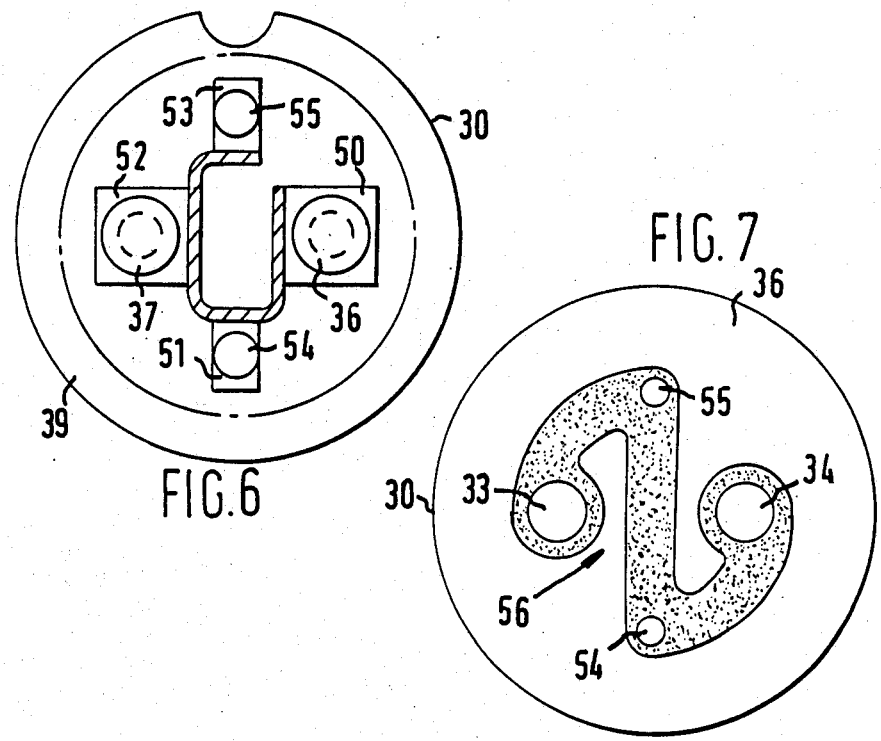
FIG. 6
FIG. 7

RESISTIVE WEAR SENSORS

This invention relates to resistive wear sensors that are used to provide a given indication that wear in a component has reached a specific point (the wear point). One example of such use is in traction brake linings and another is in cyclone dust separator linings.

The present invention is particularly concerned with wear sensors of the type that undergo a specific change in resistance at a given wear point; enabling an electrical detection circuit connected to the sensor to respond to the change in resistance.

It is known to provide a wear sensor wherein a particular component is broken at the wear point, causing an open circuit; as disclosed for example in United Kingdom Patent Specification No. 1603741 (Trolex). The drawback with this type of sensor is that false wear point signals can be generated by open circuit failures. Another type of known sensor is the continuously wearable type wherein the resistance of the sensor increases as its cross-section decreases with wear; as disclosed for example in United Kingdom Patent Specification No. 2017807A (Morganite) or United Kingdom Patent Specification No. 1341814 (Computas). The drawback with this type of sensor is that it does not give a specific wear point signal unless the wear point is when the sensor is completely worn through; such use of this sensor type would not only be a bastardised use of the sensor but would also have the same drawback of false wear point signals as the previous type. Computas also discloses the concept of several resistive wear sensors which "lie with different spacing from the surface of the machine element, whereby they function in succession as the wearing-down proceeds" (see page 3, lines 55 to 56 of Computas).

It is an object of the present invention to provide a resistive wear sensor that, in combination with an electrical detection circuit, gives a specific wear point signal and further provides a circuit continuity signal to guard against false wear point signals.

According to the present invention, a resistive wear sensor comprises a base having a topside and an underside; output connector means attached to extend from the underside of the base and for connection to an external detection circuit; a series of electrically conductive linkage means mounted on the topside of the base in a position to be worn, each of the linkage means extending to a different height above the topside of the base, each linkage means being electrically serially connected between the output connector means and being electrically connected in parallel therebetween; and, a series of resistor means mounted on the base in a position protected from wear, the resistor means being electrically serially connected directly between the output connector means, each of the resistor means being electrically connected in parallel with a respective one of the series of linkage means; whereby wear of the sensor to the different heights successively cuts each of the linkage means to produce a series of abrupt, discrete changes in the resistance of the sensor between the output means, the series of linkage means being formed of soft metal to have a plurality of tongues descending parallel to one another from a common cross-piece, the tongues being of differing lengths, adjacent tongues and the associated part of the cross-piece forming individual linkage means, and the cross-piece parts being at differing heights above the topside of the base.

The present invention also comprises a resistive wear sensor as above wherein the output connector means are a pair of headed pins passing through the base, first and last tongues are rivetted to a respective one of the pin heads, each remaining tongue is attached to the base by a rivet passing therethrough and the series of resistors are printed on the underside of the base to serially interconnect one of the pins, the rivets and the other of the pins.

Also in accordance with the invention, a resistive wear sensor comprises a base having a topside and an underside; output connector means attached to extend from the underside of the base and for connection to an external detection circuit; electrically conductive linkage means mounted on the topside of the base in a position to be worn and extending to a given height above the topside of the base, the linkage means being electrically serially connected between the output connector means; and, resistor means mounted on the base in a position protected from wear, the resistor means being electrically serially connected directly between the output connector means and in parallel with the linkage means; whereby wear of the sensor to the given height cuts the linkage means to produce an abrupt, discrete change in the resistance of the sensor between the output means, wherein the linkage means is an inverted soft metal U-shaped link, the resistor means is a resistor formed on the underside of the base and the height of the U-shaped link above the top side of the base sets the wear indication height for the sensor, and wherein the output connector means are a pair of headed pins passing through the base, the U-shaped link is rivetted to the pin heads and the resistor is printed on the underside of the base between the pins.

The present invention is illustrated, by way of example, in the Drawings, wherein:

FIG. 5 is a cross-sectional elevation of a conductive multiple wear point indicator in accordance with a fourth embodiment;

FIG. 6 is a plan of the fourth embodiment;

FIG. 7 is an underplan of the fourth embodiment; and,

Figure 1:
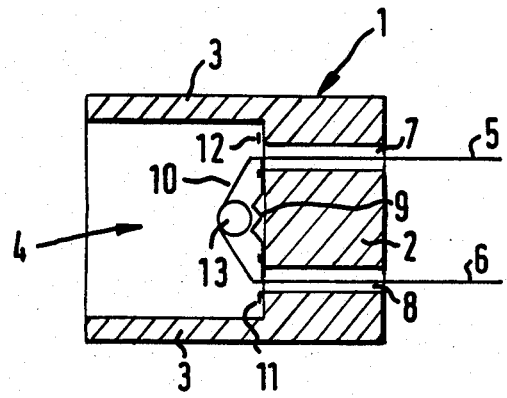
FIG. 1 is a schematic diagram of a resistive/conductive single wear point sensor in accordance with a first embodiment of the invention.

As shown by FIG. 1, a single wear point sensor has a housing 1 of abradable, electrically insulating material having a base 2 and side walls 3 defining a central cavity 4. A pair of output leads 5 and 6 pass through bores 7 and 8 in the base 2 into the cavity 4. A resistor 9 is connected between the output leads 5 and 6 and is shown to lie against the base 2 within the cavity 4. A linking wire 10 of conductive or low resistive material (in relation to the resistance of the resistor) is connected to the output leads 5 and 6 by means of brass rivets 11 and 12, the resistor 9 also being connected between the two rivets. A spacer 13, shown to be located between the wire link 10 and the resistor 9, sets the height of the wire link 10 within the housing cavity 4 and protects the resistor 9 from wear.

In use, the sensor is connected into a wearing item to the correct depth. Before the sensor is worn, there will be a low electrical resistance between the output leads 5 and 6 due to the wire link 10. When the wear reaches the wire link (the wear point) the link is broken and the resistance of the sensor, as measured between the output leads, increases to the value of resistor 9; which is a previously known value.

This sensor thus changes its resistance when the wear point is reached and it is also possible to distinguish between the wear point being reached and a circuit discontinuity; the sensor output having three possible values:

(i) low resistance—indicating link unworn and circuit without fault.
(ii) resistance equal to that of resistor 9—indicating link worn and broken, but circuit without fault.
(iii) open circuit—indicating a circuit fault.

Figure 2:
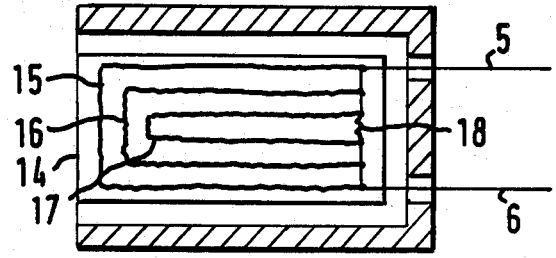
FIG. 2 is a schematic diagram of a resistive multiple wear point sensor in accordance with a second embodiment.

The multiple wear point sensor shown by FIG. 2 has the link wire 10 and the resistor 9 of the FIG. 1 embodiment replaced by a rectangular board 14 of insulating, abradable material having a series of resistive tracks 15, 16 and 17 formed thereon, which tracks generally follow the board borders within one another and are electrically connected in parallel to link between the output leads 5 and 6. The resistor 9 being formed by a further track 18 shown to be in a protected position at the bottom of the board 14 and is directly connected between the output leads to be in parallel with the link tracks.

In use and before any wear occurs the multiple link tracks provide a low resistance value between the sensor's output leads. As wear takes place, successive tracks are broken and the sensor resistance successively increases. By design this can be linear with wear. In this embodiment, the sensor can have more than three output values, the first and last being the same as (i) and (iii) above, but the intermediate step values depending on the number of and value of link tracks.

Figures 3, 4:
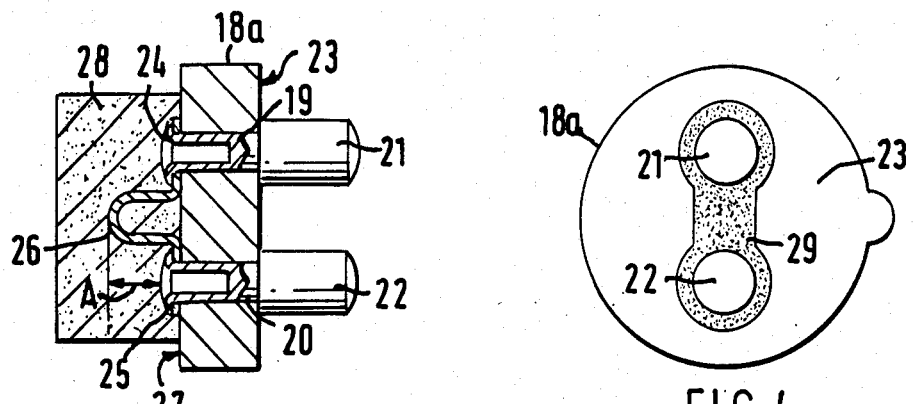
FIG. 3 is a cross-sectional elevation of a conductive single wear point sensor in accordance with a third embodiment.
FIG. 4 is an underplan of the third embodiment.

The single wear point sensor shown by FIGS. 3 and 4 consists of a circular base 18a of electrically insulating ceramic or high temperature plastics material having the smaller diameter stems of 19 and 20 of a pair of metallic pins 21 and 22 located in axial holes in the base that are diametrically opposed to one another. The pins proper being on the underside 23 of the base whilst the pins' heads 24 and 25 are deformed to rivet a U-shaped link 26 of soft brass to the top 27 of the base; the link 26 making electrical connection to both pins 21 and 22. The height "A" of the link above the pin rivet heads setting the wear point for the sensor. The link and the top of the sensor are embedded in a protective cylinder 28 of a suitable electrically insulating, abradable epoxy resin potting compound or of an electrically insulating, abradable ceramic material. This sensor has the same three output values as the sensor of FIG. 1.

A resistor 29 is formed on the underside 23 of the base as shown in FIG. 4 to provide a resistive connection between the pins 21 and 22 and electrically in parallel with the link 26. Resistor 29 may be formed by screen printing a resistive ink on to the base underside 23 and then heat treating.

Figure 8:
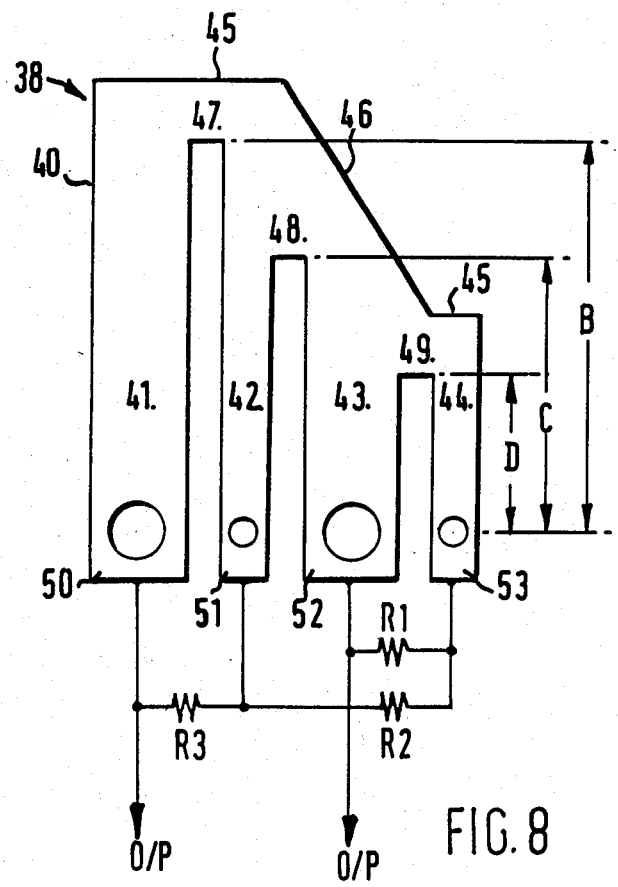
FIG. 8 is a detail showing the conductive multiple link element for the fourth embodiment, prior to bending.

The sensor shown by FIGS. 5 to 8, again consists of a circular base 30 of electrically insulating ceramic or high temperature plastics material and with the smaller diameter stems 31 and 32 of a pair of metallic pins 33 and 34 located in axial holes in the base that are diametrically opposed to one another. The pins proper being on the underside 35 of the base whilst the pins' heads 36 and 37 are deformed to rivet a soft brass conductive element 38 to the top 39 of the base. This element 38 is shown more clearly in FIG. 8 to be a sheet of brass 40 having four descending tongues 41, 42, 43 and 44 of varying length from a top edge 45, shown to have a step therein connected by a slope 46, so that the tongues 41 and 42 are bridged by a link 47 at a height "B", tongues 42 and 43 are bridged by a link 48 at height "C" and tongues 43 and 44 are bridged by a link 49 at height "D". The tongues' bottom ends 50, 51, 52 and 53 being approximately co-aligned. The sheet 40 is bent into a rectangular box-section with the tongue bottom ends outturned; ends 50 and 52 being rivetted by pin heads 36 and 37 respectively, whilst ends 51 and 53 are attached to the base by rivets 54 and 55 which pass through axial holes (not shown) in the base that are diametrically opposed to one another and in quadrature with the holes for pin stems 31 and 32. The pins and rivets providing electrical connection to the respective tongue of the link element 38. The conductive link element and sensor may or may not be encapsulated in electrically insulating, abradable potting compound or ceramic.

A resistor 56 is formed (such as by printing as described above) on the underside 35 of the base and, as shown by FIG. 7, has an S-shape to resistively connect the pins 33 and 34 and the rivets 54 and 55. The three resistive parts of resistor 56 are indicated diagrammatically in FIG. 8 as a resistor R3 connecting tongues 41 and 42; a resistor R2 connecting tongues 42 and 44; and a resistor R1 connecting tongues 43 and 44; the pins 33 and 34 providing the output connections for the sensor.

In use, the unworn sensor exhibits an effectively zero resistance between the output pins, when the link 47 is worn through this resistance rises to the value of resistor R3, when link 48 is worn through the resistance rises to the value of resistors R3 +R2 and when link 49 is worn through the resistance rises to the value of resistors R3+R2+R1; thus providing a stepped indication of multiple wear points and a continuous indication of sensor and detector circuit continuity.

In all the above described embodiments, the resistor means, i.e. resistor 9, resistor 18, resistor 29 or resistor 56 provides a "continuity" signal in the worn sensor. Thus sensors in accordance with any of the embodiments will be safer in service because, generally, an open circuit indicates a fault condition not a wear condition. Clearly, the closer the resistor means can be positioned to the link element (whilst protecting it against wear) the more secure the sensor and detector circuit will be against false signals.

We claim:

1. A resistive wear sensor comprising:
   (i) a base having a topside and an underside;
   (ii) output connector means attached to extend from the underside of said base and for connection to an external detection circuit;
   (iii) electrically conductive linkage means mounted on the topside of said base in a position to be worn and extending to a given height above the topside of said base, said linkage means being electrically serially connected between said output connector means; and,
   (iv) resistor means mounted on said base in a position protected from wear, said resistor means being electrically serially connected directly between said output connector means and in parallel with said linkage means;

whereby wear of the sensor to said given height cuts said linkage means to produce an abrupt, discrete change in the resistance of the sensor between said output means, wherein said linkage means is an inverted soft metal U-shaped link, the resistor means is a resistor formed on the underside of said base and the height of the U-shaped link above the top side of said base sets the wear indication height for the sensor, and wherein said output connector means are a pair of headed pins passing through said base, said U-shaped link is rivetted to said pin heads and said resistor is printed on the underside of said base between said pins.

2. A resistive wear sensor comprising:
(i) a base having a topside and an underside;
(ii) output connector means attached to extend from the underside of said base and for connection to an external detection circuit;
(iii) a series of electrically conductive linkage means mounted on the topside of said base in a position to be worn, each of said linkage means extending to a different height above the topside of said base, each said linkage means being electrically serially connected between said output connector means and being electrically connected in parallel therebetween; and,
(iv) a series of resistor means mounted on said base in a position protected from wear, said resistor means being electrically serially connected directly between said output connector means, each of said resistor means being electrically connected in parallel with a respective one of said series of linkage means;

whereby wear of the sensor to said different heights successively cuts each of said linkage means to produce a series of abrupt, discrete changes in the resistance of the sensor between said output means and said series of linkage means being formed of soft metal to have a plurality of tongues descending parallel to one another from a common cross-piece, said tongues being of differing lengths, adjacent tongues and the associated part of said cross-piece forming individual linkage means and said cross-piece parts being at differing heights above the topside of said base.

3. A resistive wear sensor as claimed in claim 2, wherein said output connector means are a pair of headed pins passing through said base, first and last tongues are rivetted to a respective one of said pin heads, each remaining tongue is attached to said base by a rivet passing therethrough and said series of resistors are printed on the underside of said base to serially interconnect one of said pins, said rivets and the other of said pins.

* * * * *